(12) United States Patent
Gorrie

(10) Patent No.: US 10,981,490 B1
(45) Date of Patent: Apr. 20, 2021

(54) POSITIONING APPARATUS FOR CARGO SECURING IMPLEMENT

(71) Applicant: Jolene Marie Gorrie, Baynes Lake (CA)

(72) Inventor: Jolene Marie Gorrie, Baynes Lake (CA)

( * ) Notice: Subject to any disclaimer, the term of this patent is extended or adjusted under 35 U.S.C. 154(b) by 26 days.

(21) Appl. No.: 16/693,287

(22) Filed: Nov. 23, 2019

Related U.S. Application Data

(60) Provisional application No. 62/784,390, filed on Dec. 22, 2018.

(51) Int. Cl.
*B60P 7/08* (2006.01)

(52) U.S. Cl.
CPC ................... *B60P 7/0853* (2013.01)

(58) Field of Classification Search
CPC ..... B60P 7/0853; B65B 13/18; B65B 13/183; B65B 13/184; B65B 13/34; B65B 17/00; B65B 17/02; B65B 17/025; B65H 1/00; F16B 1/00
USPC ...... 410/97, 98; 294/81.1, 81.4, 81.41, 81.6, 294/67.1, 67.2, 67.3, 67.4, 67.41; 124/5
See application file for complete search history.

(56) References Cited

U.S. PATENT DOCUMENTS

| | | | | |
|---|---|---|---|---|
| 1,774,623 A * | 9/1930 | Williams | ............. | B66C 1/22 294/81.6 |
| 2,020,174 A * | 11/1935 | Derossi | ............. | B66C 1/20 294/81.55 |
| 4,232,648 A * | 11/1980 | Brown | ............. | F41B 3/00 124/41.1 |
| 4,564,161 A * | 1/1986 | Frye | ............. | B64D 1/22 244/137.2 |
| 5,143,326 A * | 9/1992 | Parks | ............. | B64D 1/22 244/118.1 |
| 5,445,426 A * | 8/1995 | Sorensen | ............. | B66C 1/10 294/67.3 |
| 5,476,300 A * | 12/1995 | Dodge | ............. | B66C 1/54 294/67.33 |
| 5,800,000 A * | 9/1998 | Shockley | ............. | B66C 1/107 294/67.5 |
| 5,975,603 A * | 11/1999 | Novak-Taurman | ............. | B66C 1/62 294/67.3 |
| 2004/0256870 A1 * | 12/2004 | Nowak | ............. | B66C 1/10 294/67.1 |
| 2008/0314372 A1 * | 12/2008 | Guindon | ............. | B60P 7/0853 124/5 |

(Continued)

*Primary Examiner* — Hilary L Gutman
(74) *Attorney, Agent, or Firm* — Gulf Coast Intellectual Property Group

(57) ABSTRACT

A positioning apparatus that is configured to assist in the placement of cargo securing chains or similar elements so as to secure a cargo load. The positioning apparatus includes a cable having a first end and a second end. The first end of the cable is secured to a weight member. The second end of the cable is secured to a mounting plate. The mounting plate of the present invention is planar in manner having an upper peripheral edge that is arcuate in form. The mounting plate has a first aperture proximate the upper peripheral edge. A pair of lower apertures are formed in the mounting plate along the lower edge thereof. A first fastener and a second fastener are operably coupled to the pair of lower apertures. Chains are secured to the first fastener and second fastener.

11 Claims, 2 Drawing Sheets

(56) References Cited

U.S. PATENT DOCUMENTS

| | | | |
|---|---|---|---|
| 2013/0236324 A1* | 9/2013 | Bech | B66C 1/108 416/233 |
| 2013/0322981 A1* | 12/2013 | Root | B60P 7/0823 410/97 |
| 2015/0232303 A1* | 8/2015 | Stitt | B66C 1/10 294/81.1 |
| 2015/0291079 A1* | 10/2015 | Wright | B60P 7/0869 410/100 |
| 2015/0357802 A1* | 12/2015 | Devine | H02G 1/04 294/81.6 |
| 2018/0304798 A1* | 10/2018 | Hamilton | B60P 7/0853 |

* cited by examiner

US 10,981,490 B1

POSITIONING APPARATUS FOR CARGO SECURING IMPLEMENT

PRIORITY UNDER 35 U.S.C SECTION 119(E) & 37 C.F.R. SECTION 1.78

This nonprovisional application claims priority based upon the following prior United States Provisional Patent Application entitled: Positioning Apparatus for Cargo Securing Implement, Application No.: 62/784,390 filed Dec. 22, 2018, in the name of Jolene Marie Gorrie, which is hereby incorporated by reference for all purposes.

FIELD OF THE INVENTION

The present invention relates generally to cargo securing apparatus, more specifically but not by way of limitation, an apparatus configured to assist a user in the positioning of a cargo securing apparatus such as but not limited to chains wherein the apparatus facilitates placement of the chains around a high load.

BACKGROUND

Millions of tractor trailers traverse the roads on a daily basis carrying various types of cargo. As is known in the art, there are numerous types of trailers configured to receive, support and carry alternate types of cargo. Tractor trailers are configured to receive and transport items such as but not limited to palletized loads, equipment and other items. Specialized loads such as steel beams or similar structures will often require the use of flat-bed trailers. Another specialized load type are cut trees. As is known in the art, trailers designed to carry logged trees have axially aligned u-shaped supports that are disposed along the frame of the trailer. While the trailer does assist in the maintenance of the cargo, the logs require additional securing to meet transportation and safety requirements.

One issue with securing a load of logs is the challenge in securing safety chains or similar apparatus circumferentially around the load. Typically, a driver will need to secure at least two chains around the load so as to assist in securing the load of logs and ensure regulatory requirements are met. Many drivers will attempt to throw the chain over the load of logs and then retrieve the thrown end on the opposing side. The chains utilized to secure such loads are heavy and attempts to throw them over the top of a tall load of logs can cause injury to a driver's shoulders or back. In addition to logging trucks, there are numerous types of loads that are carried on flatbed style trailers wherein securing straps must be utilized to ensure the maintenance of the cargo position during transport.

It is intended within the scope of the present invention to provide a positioning apparatus for a cargo securing item such as but not limited to a chain wherein the apparatus of the present invention provides an improved technique to position chains or the like over the top of a load of cargo.

SUMMARY OF THE INVENTION

It is the object of the present invention to provide a positioning apparatus for a cargo securing implement such as but not limited to a chain wherein the present invention provides a technique to position chains or the like over the top of a cargo load superposed a trailer ready for transport.

Another object of the present invention is to provide a positioning apparatus for safety chains wherein the safety chains are designed to secure a load of cargo to a trailer wherein the present invention includes a lead cable having a first end and a second end.

A further object of the present invention is to provide a positioning apparatus for a cargo securing implement such as but not limited to a chain wherein the lead cable of the present invention includes a weight or configuration of weight secured to the second end thereof.

Still another object of the present invention is to provide a positioning apparatus for safety chains wherein the safety chains are designed to secure a load of cargo to a trailer wherein first end of the lead cable is secured to a mounting plate.

An additional object of the present invention is to provide a positioning apparatus for a cargo securing implement such as but not limited to a chain wherein the mounting plate is planar in manner having an upper edge and a lower edge.

Yet a further object of the present invention is to provide a positioning apparatus for safety chains wherein the safety chains are designed to secure a load of cargo to a trailer wherein the upper edge of the mounting plate includes an aperture proximate thereto and wherein the aperture is centrally located.

Another object of the present invention is to provide a positioning apparatus for a cargo securing implement such as but not limited to a chain wherein the mounting plate further includes a second and a third aperture being located proximate the bottom edge and further being distally located thereon.

An alternate object of the present invention is to provide a positioning apparatus for safety chains wherein the safety chains are designed to secure a load of cargo to a trailer wherein a first fastener is journaled through the second aperture located proximate the lower edge of the mounting plate.

Still a further object of the present invention is to provide a positioning apparatus for a cargo securing implement such as but not limited to a chain wherein a second fastener is journaled through the third aperture located proximate the lower edge of the mounting plate.

An additional object of the present invention is to provide a positioning apparatus for safety chains wherein the safety chains are designed to secure a load of cargo to a trailer wherein the upper edge is arcuate in shape so as to reduce the potential to snag on a cargo load.

A further object of the present invention is to provide a positioning apparatus for a cargo securing implement such as but not limited to a chain wherein the mounting plate is generally semi-circular in shape.

An alternative objective of the present invention is to provide a positioning apparatus for safety chains wherein the safety chains are designed to secure a load of cargo to a trailer wherein the first fastener is configured to be releasably secured to a chain.

Yet a further object of the present invention is to provide a positioning apparatus for a cargo securing implement such as but not limited to a chain wherein the second fastener is configured to be secured to a chain.

An additional object of the present invention is to provide a positioning apparatus for safety chains wherein the safety chains are designed to secure a load of cargo to a trailer wherein the lead cable is thrown over the cargo load and subsequently utilized to traverse the chains across the top of the load of cargo.

A further object of the present invention is to provide a positioning apparatus for a cargo securing implement such as but not limited to a chain wherein the mounting plate is manufactured from a lightweight rigid material such as but not limited to plastic.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
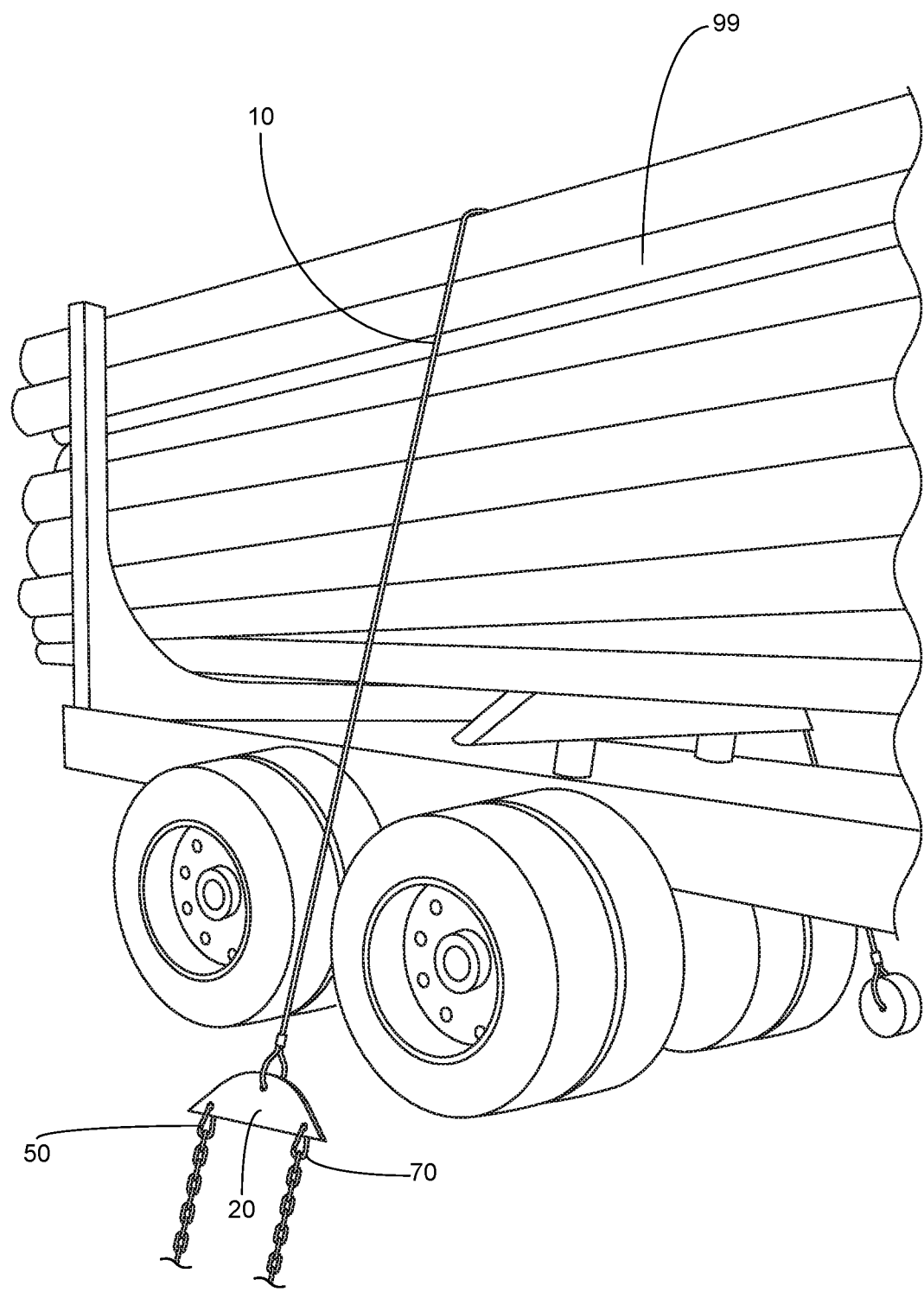
FIG. 1 is a perspective view of a portion of the present invention in a starting position on a cargo load.
Figure 2:
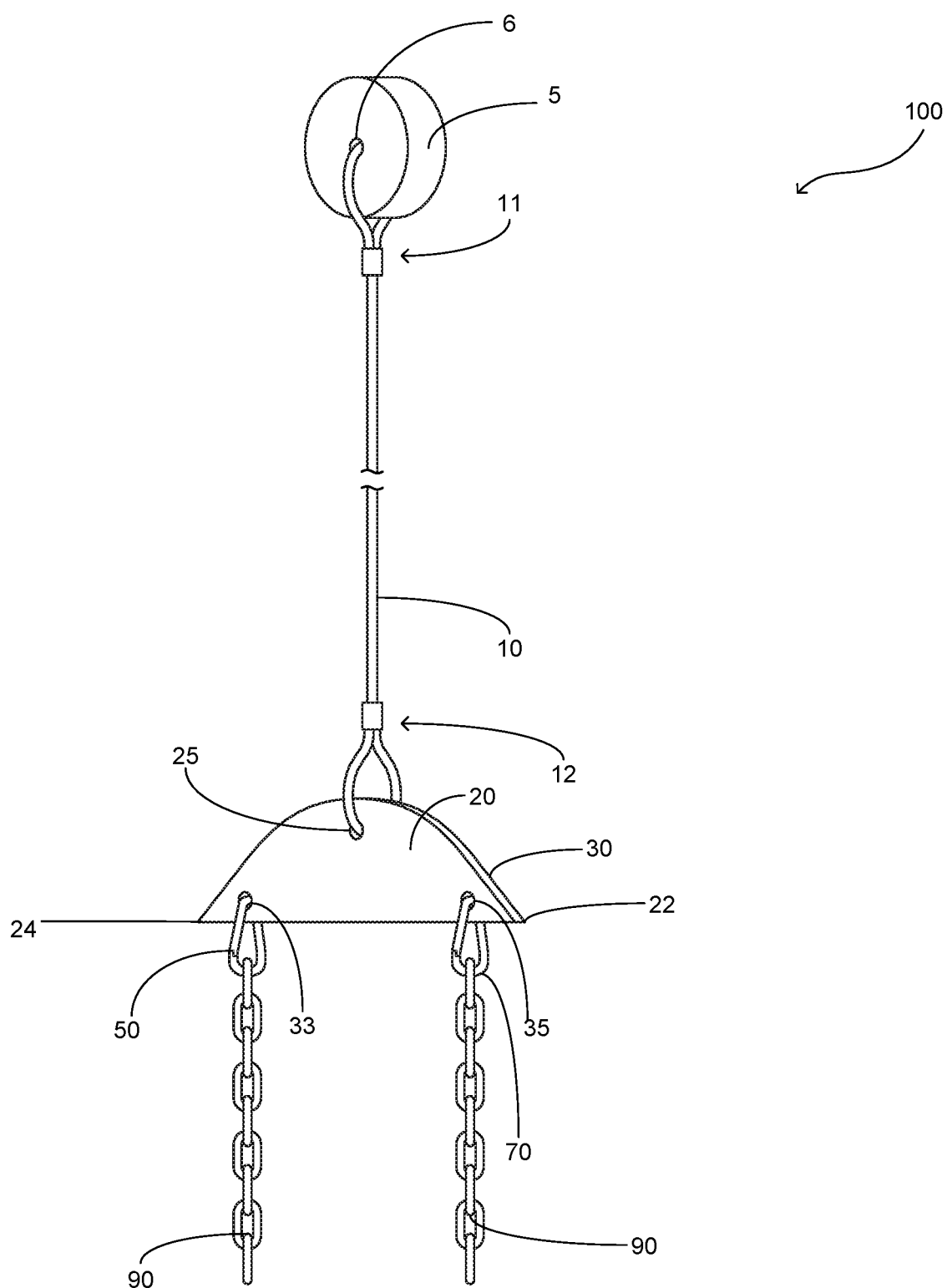
FIG. 2 is a side view of the present invention.

Referring now to the drawings submitted herewith, wherein various elements depicted therein are not necessarily drawn to scale and wherein through the views and figures like elements are referenced with identical reference numerals, there is illustrated a positioning apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Figures submitted herewith, the positioning apparatus 100 includes a throw weight 5 that is operably coupled to cable 10. The weight member 5 is manufactured from a suitable durable material such as but not limited to metal or plastic. The weight member 5 is annular in shape having an aperture 6 formed in the middle thereof. Aperture 6 is formed to have the first end 11 of the cable 10 journaled therethrough. The weight member 5 is manufactured to weigh a sufficient amount so that the weight member 5 can be easily tossed over an exemplary cargo load 99 and facilitate placement of the cable 10. It should be understood within the scope of the present invention that the weight member 5 be approximately two to five pounds. The weight member 5 is operable to be thrown over the top of the exemplary cargo load 99 and position the cable 10 on the top thereof wherein the weight member 5 is subsequently accessible on the opposing side of the exemplary cargo load 99. As will be further discussed herein, with the first end 11 of the cable 10 being transitioned to the opposing side of the exemplary cargo load 99, a user of the positioning apparatus 100 can then commence securing the cargo using the cargo securing implements 98 secured to the mounting plate 20. While the weight member 5 is illustrated herein as being annular in shape, it is contemplated within the scope of the present invention that the weight member 5 could be provided in alternate shapes and sizes. Additionally, while the positioning apparatus 100 is illustrated herein with a single weight member 5, it is contemplated within the scope of the present invention that more than one weight member 5 could be employed in the positioning apparatus 100.

The second end 12 of the cable 10 is secured to the mounting plate 20 utilizing suitable durable techniques. It should be understood within the scope of the present invention that the cable 10 is a conventional wire cable and could be provided in alternate sufficient lengths in order to be positioned over the top of the exemplary cargo load 99. The mounting plate 20 is planar in manner and manufactured from a durable rigid material such as but not limited to plastic. The mounting plate 20 in a preferred embodiment is generally semicircular in shape having extended corners 22, 24. It should be understood within the scope of the present invention that the mounting plate 20 could be provided in alternate sizes. The mounting plate 20 has a cable aperture 25 journaled therethrough. The cable aperture 25 is proximate upper peripheral edge 30 of the mounting plate 20. The cable aperture 25 is located proximate the midpoint of the mounting plate 20 ensuring a relative balance load distribution of chains 90 during movement of the chains over the top of the exemplary cargo load 99. The arcuate form of the upper peripheral edge 30 provides reduced snagging with the exemplary cargo load 99 as the mounting plate 20 traverses thereover. While the mounting plate 20 has been disclosed herein in a preferred embodiment, it is contemplated within the scope of the present invention that the mounting plate 20 could be formed in alternate shapes.

The mounting plate 25 includes a first lower aperture 33 and a second lower aperture 35. The first lower aperture 33 and second lower aperture 35 are proximate corners 22,24 and are operable to receive the first fastener 50 and second fastener 70. The first lower aperture 33 and a second lower aperture 35 are positioned as shown to further assist in a balanced distribution of the chains 90 during movement of the chains 90 over the top of the exemplary cargo load 99. The first fastener 50 and second fastener 70 are metal spring clips or similar device and are configured to operably couple the chains 90 to the mounting plate 20. It should be understood within the scope of the present invention that the first fastener 50 and second fastener 70 could be manufactured from various types of fasteners.

Chains 90 are operably coupled to the first fastener 50 and second fastener 70. The chains 90 are conventional metal chains and are utilized to secure the exemplary cargo load 99. It should be understood within the scope of the present invention that the chains 90 could be alternate securing elements such as but not limited to cable. The chains 90 are provided in sufficient length to surroundably mount the exemplary cargo load in an effort to provide securing thereof.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A positioning apparatus configured to assist in positioning of cargo securing implements over a cargo load wherein the positioning apparatus comprises:
    a cable, said cable having a first end and a second end;
    at least one weight member, said at least one weight member being secured to said first end of said cable;
    a mounting plate, said mounting plate being planar in manner, said mounting plate having an upper aperture, said upper aperture having the second end of said cable secured thereto; and
    a first lower aperture and a second lower aperture, said first lower aperture and said second lower aperture being distally located on said mounting plate along a lower edge thereof.

2. The positioning apparatus as recited in claim 1, and further including a first fastener, said first fastener operably coupled to said first lower aperture.

3. The positioning apparatus as recited in claim 2, and further including a second fastener, said second fastener operably coupled to said second lower aperture.

4. The positioning apparatus as recited in claim 3, wherein said mounting plate further includes an upper peripheral edge, said upper peripheral edge being arcuate in shape.

5. The positioning apparatus as recited in claim 4, wherein said at least one weight member is annular in shape, said weight member further having an aperture, said aperture configured to receive the first end of said cable therethrough.

6. The positioning apparatus as recited in claim 5, wherein the first fastener and second fastener have a chain operably coupled thereto.

7. A positioning apparatus configured to assist in positioning of cargo securing implements over a cargo load wherein the positioning apparatus comprises:
    a cable, said cable having a first end and a second end;
    a weight member, said weight member having an aperture, said weight member being secured to said first end of said cable utilizing said aperture;
    a mounting plate, said mounting plate being planar in manner, said mounting plate having an upper peripheral edge, said mounting plate have a lower peripheral edge, said mounting plate having an upper aperture, said mounting plate being proximate the upper peripheral edge, said upper aperture having the second end of said cable secured thereto;
    a first lower aperture and a second lower aperture, said first lower aperture and said second lower aperture being distally located on said mounting plate along the lower peripheral edge;
    a first fastener, said first fastener operably coupled to said first lower aperture;
    a second fastener, said second fastener operably coupled to said second lower aperture.

8. The positioning apparatus as recited in claim 7, wherein the upper aperture is located proximate a midpoint of the upper peripheral edge.

9. The positioning apparatus as recited in claim 8, wherein said weight member is annular in shape.

10. The positioning apparatus as recited in claim 9, wherein the first fastener and second fastener have a chain operably coupled thereto.

11. The positioning apparatus as recited in claim 10, wherein the upper peripheral edge of said mounting plate is arcuate in shape.

* * * * *